United States Patent
Harris et al.

(10) Patent No.: US 6,795,938 B2
(45) Date of Patent: *Sep. 21, 2004

(54) MEMORY ACCESS CONTROLLER WITH RESPONSE FAKING

(75) Inventors: Jeremy Graham Harris, Chalfont St. Giles (GB); Paul Durrant, Farnham Royal (GB)

(73) Assignee: Sun Microsystems, Inc., Santa Clara, CA (US)

( * ) Notice: Subject to any disclaimer, the term of this patent is extended or adjusted under 35 U.S.C. 154(b) by 586 days.

This patent is subject to a terminal disclaimer.

(21) Appl. No.: 09/783,120

(22) Filed: Feb. 13, 2001

(65) Prior Publication Data

US 2002/0042895 A1 Apr. 11, 2002

(30) Foreign Application Priority Data

Oct. 3, 2000 (GB) .............................................. 0024187

(51) Int. Cl.⁷ ................................................ G06F 11/00
(52) U.S. Cl. ........................................... 714/42; 714/42
(58) Field of Search ............................ 714/3, 5, 39, 42, 714/43, 47, 48; 711/202, 203; 718/104

(56) References Cited

U.S. PATENT DOCUMENTS

| | | | | |
|---|---|---|---|---|
| 4,188,670 A | * | 2/1980 | Hsia | 365/49 |
| 4,719,626 A | * | 1/1988 | Ogasawara | 714/33 |
| 4,972,345 A | * | 11/1990 | Munier et al. | 714/48 |
| 5,455,834 A | * | 10/1995 | Chang et al. | 714/768 |
| 5,493,660 A | | 2/1996 | DeLano et al. | |
| 5,627,965 A | * | 5/1997 | Liddell et al. | 714/48 |
| 5,819,027 A | * | 10/1998 | Budelman et al. | 714/47 |
| 5,881,282 A | * | 3/1999 | Shipman | 713/2 |
| 6,067,634 A | * | 5/2000 | Nelson | 714/4 |
| 6,145,055 A | * | 11/2000 | Fujimoto | 711/128 |
| 6,353,898 B1 | * | 3/2002 | Wipfel et al. | 714/48 |
| 6,532,505 B1 | | 3/2003 | Stracovsky et al. | |
| 6,560,724 B1 | * | 5/2003 | Ganske | 714/43 |
| 6,651,182 B1 | | 11/2003 | Chang et al. | |

* cited by examiner

*Primary Examiner*—Nadeem Iqbal
*Assistant Examiner*—Timothy M. Bonura
(74) *Attorney, Agent, or Firm*—Meyertons Hood Kivlin Kowert & Goetzel, P.C.; B. Noël Kivlin

(57) ABSTRACT

A memory controller controls access to one or more memory units. The memory controller includes access control logic operable to receive a memory access request that references at least one memory address. It further includes a fake response record operable to record a fake response indication for an address for which a response is to be faked. The access control logic is operable on receipt of a memory access request to access the fake response record and to fake a response where a fake response indication for an address indicates that a response is to be faked. By providing such a faked response, an embodiment of the invention is able avoid multiple exceptions for the same memory location in a CPU. Also, by providing such a faked response, multiple bus errors for a memory location can also be avoided where a bus supports Direct Memory Access (DMA). The memory controller can be implemented in an integrated circuit. It can form part of a memory subsystem including the memory controller and at least one memory unit in an integrated circuit.

24 Claims, 7 Drawing Sheets

MEMORY ACCESS CONTROLLER WITH RESPONSE FAKING

BACKGROUND OF THE INVENTION

The invention relates to the control of access to memory in a computer system.

A problem that the present invention addresses is the control of access to memory in a computer system in the event of an error related to one or more memory locations to be accessed. Accessing system memory can cause processor exceptions where, for example, a memory fails to respond to an access request, or data is returned that contains unrecoverable errors. Also, memory problems can cause bus errors on I/O buses supporting Direct Memory Access (DMA) by system devices other than the Central Processing Unit (CPU) of a processor.

Various approaches to resource access control have been proposed.

U.S. Pat. No. 5,627,965 describes a fault tolerant computer system including a central processor sub-system and a plurality of other subsystems, the subsystems being connected via a main data transfer bus. The central processor subsystem comprises three central processor modules. Each central processor module (or CPUset) includes a central processing unit (CPU) connected to a private bus, a first bus interface connecting the private bus to a shared bus, and a second bus interface connecting the shared bus to the main bus. The CPUsets are connected over respective private buses to a shared bus. Connected to the shared bus is a slot response memory. The slot response memory includes locations corresponding to respective slots for subsystems on the main bus. Accordingly to column 15 of U.S. Pat. No. 5,627,965, where a subsystem in a slot is functioning correctly, a location in the slot response memory corresponding to that slot will contain '0' data and the slot response register will not interfere with data transfers on the main bus. Where the subsystem in a slot becomes defective or absent from the system, then the location in the slot response memory corresponding to that slot is set to '1' and all subsequent attempts to access the defective or absent subsystem will result in artificial termination of the data transfer attempt.

PCT application PCT/US99/12605 is directed to a bridge for a fault tolerant computer system, which bridge connects I/O buses of first and second processing sets to a common I/O device bus. A resource control mechanism in the bridge provides an interface for exchanging signals with one or more resource slots of the device bus, each of the resource slots being capable of communicating with a system resource. The resource control mechanism in the bridge also includes a register associated with each system resource, the register having switchable indicia that indicate an operating state of the associated system resource. The control mechanism is operable in use to direct signals to and/or from respective system resources of the computer system.

The known systems provide for control of the access to a system resource in a slot on a bus by means of a control mechanism external to the processor. Such access control mechanisms can provide for the trapping of accesses to a faulty resource in a slot on a bus. However, they do not address specifically, the control of access to memory in a computer system in the event of an error related to one or more memory locations to be accessed. Repeated attempts to access a faulty memory location can cause multiple processor exceptions to occur, and in the case of direct memory access operations, can cause bus errors to occur.

An aim of the present invention is to provide a memory access controller, a memory subsystem, a computer system and a method of controlling memory access that addresses these problems associated with the control of access to memory.

SUMMARY OF THE INVENTION

Particular and preferred aspects of the invention are set out in the accompanying independent and dependent claims. Combinations of features from the dependent claims may be combined with features of the independent claims as appropriate and not merely as explicitly set out in the claims.

In one aspect, the invention provides a memory controller for controlling access to one or more memory units. The memory controller includes access control logic operable to receive a memory access request that references at least one memory address. It further includes a fake response record operable to record a fake response indication for an address for which a response is to be faked. The access control logic is operable on receipt of a memory access request to access the fake response record and to fake a response where a fake response indication for an address indicates that a response is to be faked.

An embodiment of the invention is able to halt an attempt to access a faulty memory location and to fake a response to such an access attempt. Specifically, a memory controller in accordance with the invention provides a faked response for selected memory locations. By providing such a faked response, an embodiment of the invention is able avoid multiple exceptions occurring for the same memory location in a CPU. Only a first exception will occur on the first error, with subsequent accesses being stopped before they can cause a further exception. Similarly, by providing such a faked response, multiple bus errors for a memory location can also be avoided where a bus supports Direct Memory Access (DMA).

An address in a received memory access request can be compared to entries in the fake response record and, where a match is found, a faked response can be generated. Where the memory access request is a read request, fake data for the faked response can also be generated. The fake data can be retrieved from a fake data register. Alternatively, it can be retrieved from the fake response record.

In one embodiment, the fake response record is a table of memory locations for which a response is to be faked. The fake response record can identify blocks of memory locations for which a response is to be faked. The fake response record can be in the form, for example, of an associative table containing entries for memory addresses for which a response is to be faked.

The memory controller can be operable, on detecting a faulty memory location, to add the memory address for that location to the fake response record. Verification of faulty responses can be determined using conventional methods, for example parity and/or other checks.

Routing logic can be provided to connect the access control logic to at least one memory unit.

The memory controller can be integrated in an integrated circuit.

In another aspect, the invention provides a memory subsystem including at least one memory controller as set out above and at least one memory unit. At least one memory controller and at least one memory unit can be integrated in the same integrated circuit.

In a further aspect, the invention provides a computer system including a processor, a bus and a memory subsystem as set out above.

The processor can be operable, on detecting a faulty memory location, to cause the access control logic to add memory address for that location to the fake response record.

In yet a further aspect, the invention provides a method of controlling memory access by a memory controller. The method includes receiving, at a memory controller, a memory access request that references at least one memory address; accessing a fake response record to determine whether a response for at least one memory for the access is to be faked; and if the response is to be faked, returning a faked response.

DESCRIPTION OF THE PREFERRED EMBODIMENTS

Exemplary embodiments of the present invention will be described hereinafter, by way of example only, with reference to the accompanying drawings in which like reference signs relate to like elements and in which.

DESCRIPTION OF PARTICULAR EMBODIMENTS

Exemplary embodiments of the present invention are described in the following with reference to the accompanying drawings.

Figure 1:
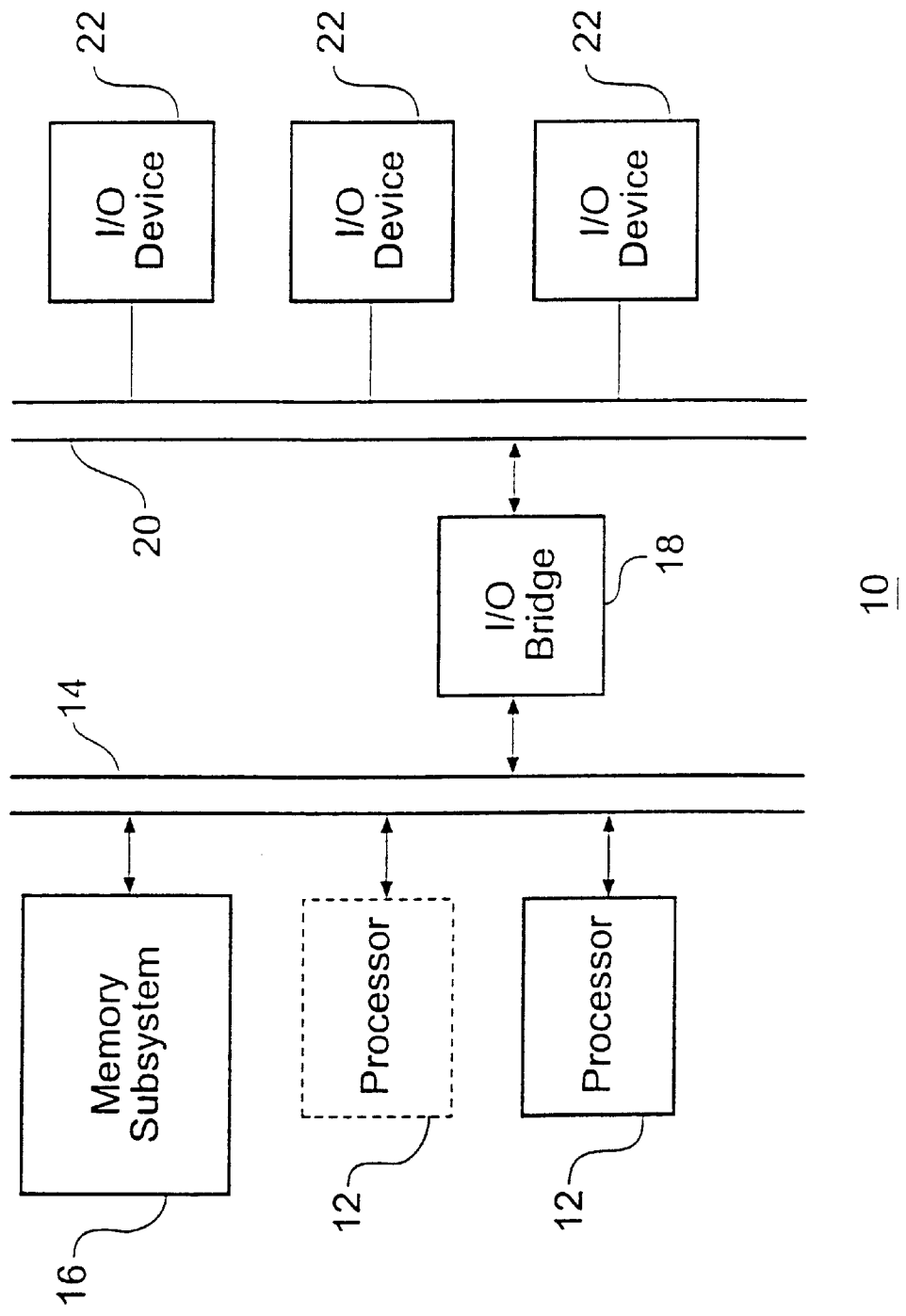
FIG. 1 is a schematic overview of a computer system.

FIG. 1 is an overview of a computer system 10 that includes at least one processor 12, a processor bus 14 to which are attached one or more subsystems including a memory subsystem 16 and an I/O bridge 18. Each processor 12 can typically be integrated in a single integrated circuit. The memory subsystem can be implemented in one or more integrated circuits, for example. The I/O bridge 18 provides an interface between the processor bus 14 and an I/O bus 20 to which a plurality of I/O devices 22 can be connected.

Figure 2:
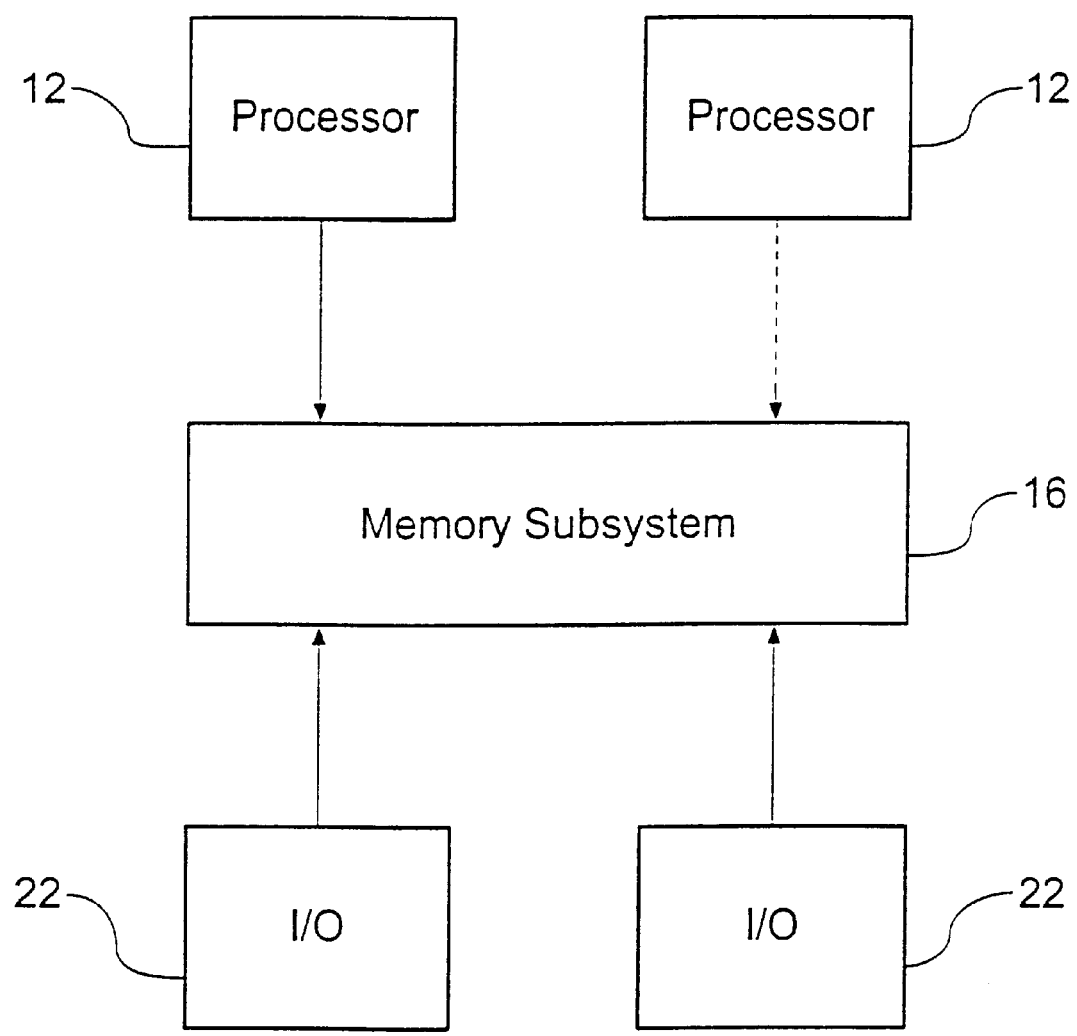
FIG. 2 is a functional overview of the relationship between a memory subsystem and other components of the computer system of FIG. 1.

FIG. 2 is a functional overview of the relationship between a memory subsystem and other components of the computer system of FIG. 1. In the present example the memory subsystem is configured to have uniform memory architecture. In other words, the processor and I/O devices are effectively centered around a common system memory in the form of the memory subsystem 16.

Figure 3:
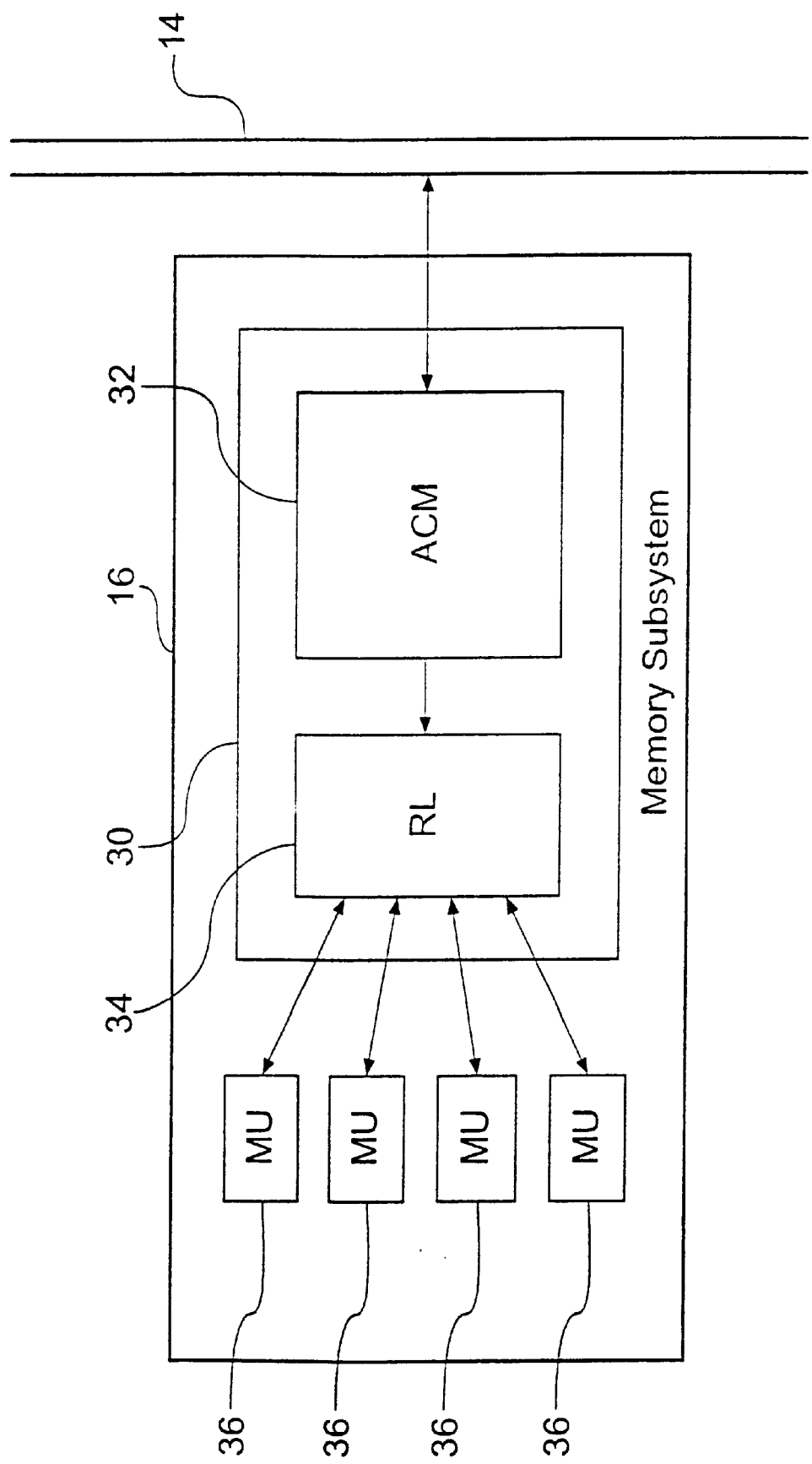
FIG. 3 is a schematic overview of the memory subsystem.

FIG. 3 is a schematic overview of the memory subsystem. This includes a memory controller 30 and a plurality of memory units 36. Typically, the memory controller 30 is implemented as one or more integrated circuits and the memory units 36 each comprises a memory device in the form of an integrated circuit.

Figure 6:
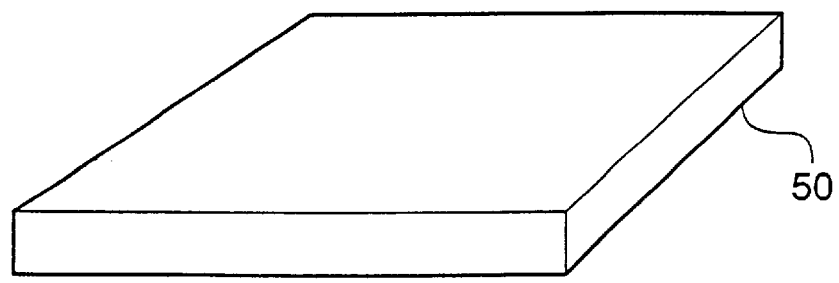
FIG. 6 represents an integrated circuit for comprising at least part of the memory subsystem.

Four memory units 36 are shown, although more or less than this number may be provided. Also, a plurality of memory units could be implemented on a single integrated circuit. Indeed, part or all of the memory controller 30 could be implemented on the same integrated circuit as one, more or all of the memory units 36. FIG. 6 represents an integrated circuit 50 that may comprise part or all of the memory controller 30 and/or part of all of one or more memory units 36. Although the memory units will typically be solid state memory units, these need not be the case and other memory or storage technology may be used.

The memory controller 30 includes an access control module 32 responsible for controlling memory access, and routing logic 34 responsive to the access control logic for routing signals to and from the memory units 36.

Figure 4:
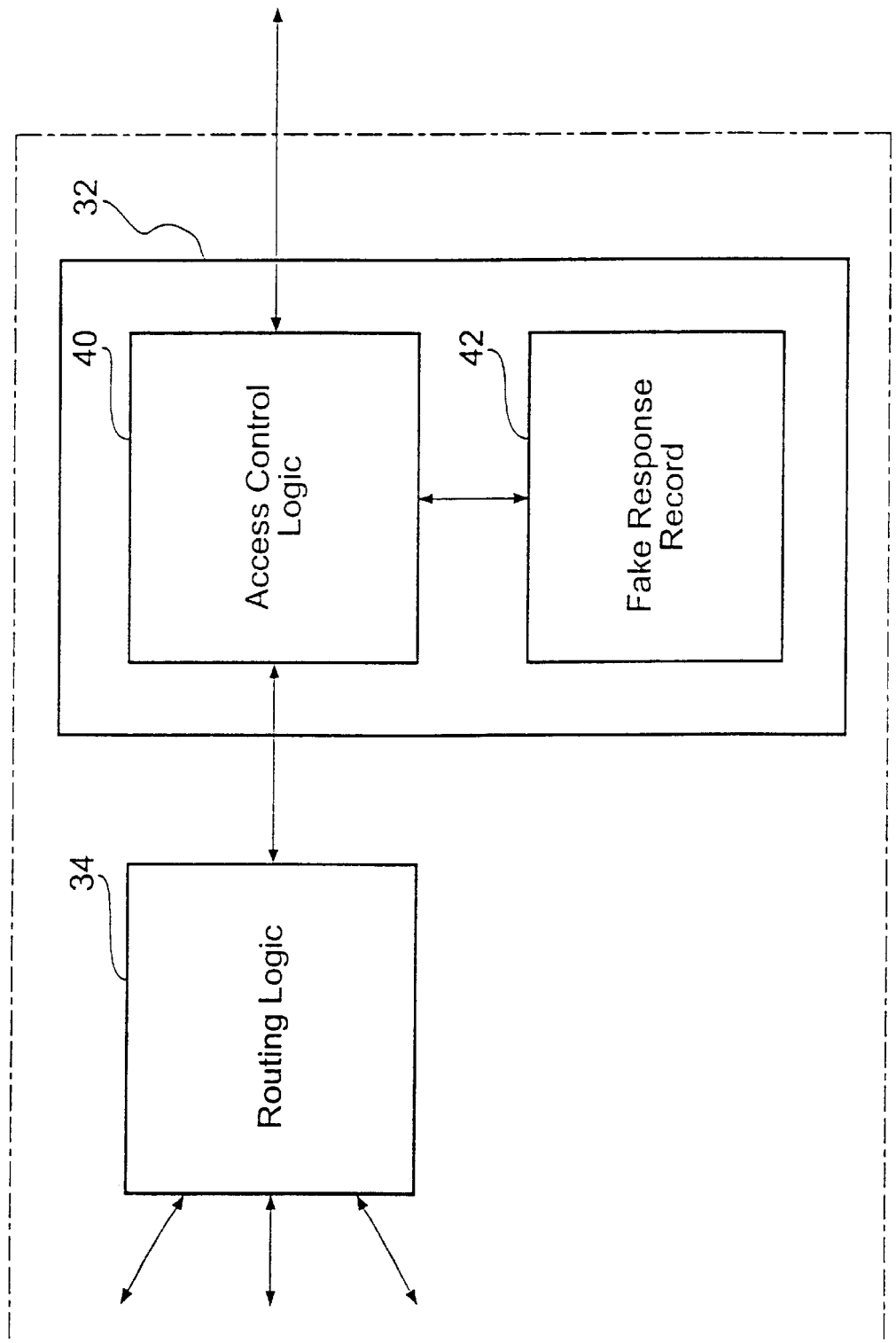
FIG. 4 is a block diagram illustrating aspects of the memory subsystem.

FIG. 4 is a block diagram illustrating aspects of the memory subsystem. This shows that the access control module 32 includes access control logic 40 and a fake response record 42. The access control logic 40 provides the logic of the access control module 32 for controlling access to the memory units. This includes the generation of control signals in response to receipt of a read or write access request and for checking and outputting a response on completion of the read or write access. The fake response record indicates memory locations in the memory for which a response is to be faked, for example because the memory location(s) is or are faulty.

Figure 5:
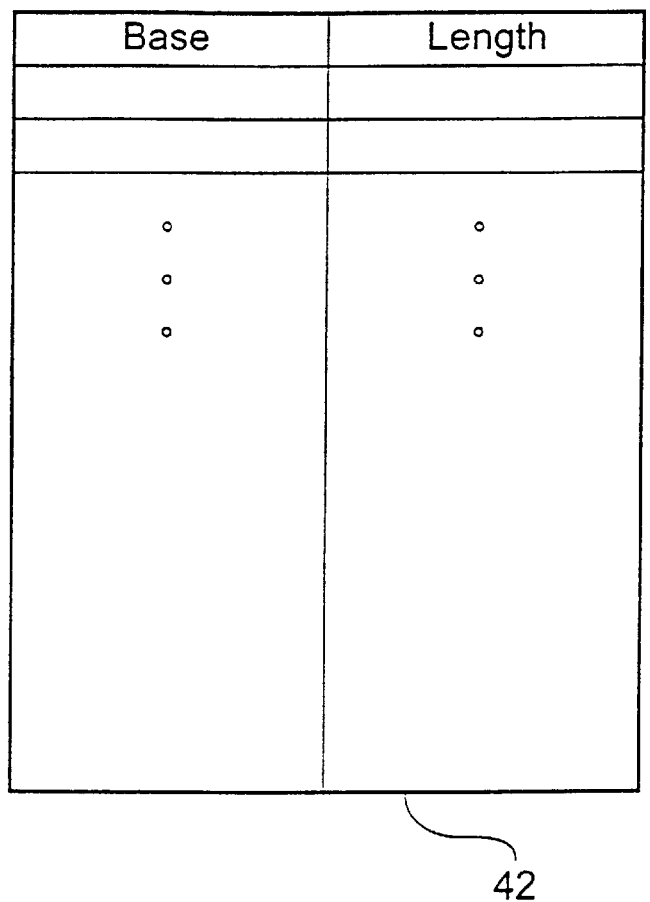
FIG. 5 illustrates a fake response record of the memory subsystem.

FIG. 5 is an example of a fake response record in tabular form. In this example the fake response record indicates blocks of memory locations for which a response is to be faked. The blocks are indicated by means of a base address for the block and a length. It will be appreciated that this is one possible example of a fake response record. For example, as an alternative, where the memory is addressed in pages, the fake response record might merely identify a physical page, the default being that a response is to be faked when an access request is received for any location within the page. In this case it is not necessary to indicate a block length. Also, rather than indicating blocks of memory locations in a table, some other storage methodology could be used, for example a run-skip representation of good and bad blocks, where the bad blocks are the ones for which a response is to be faked.

Figure 7:
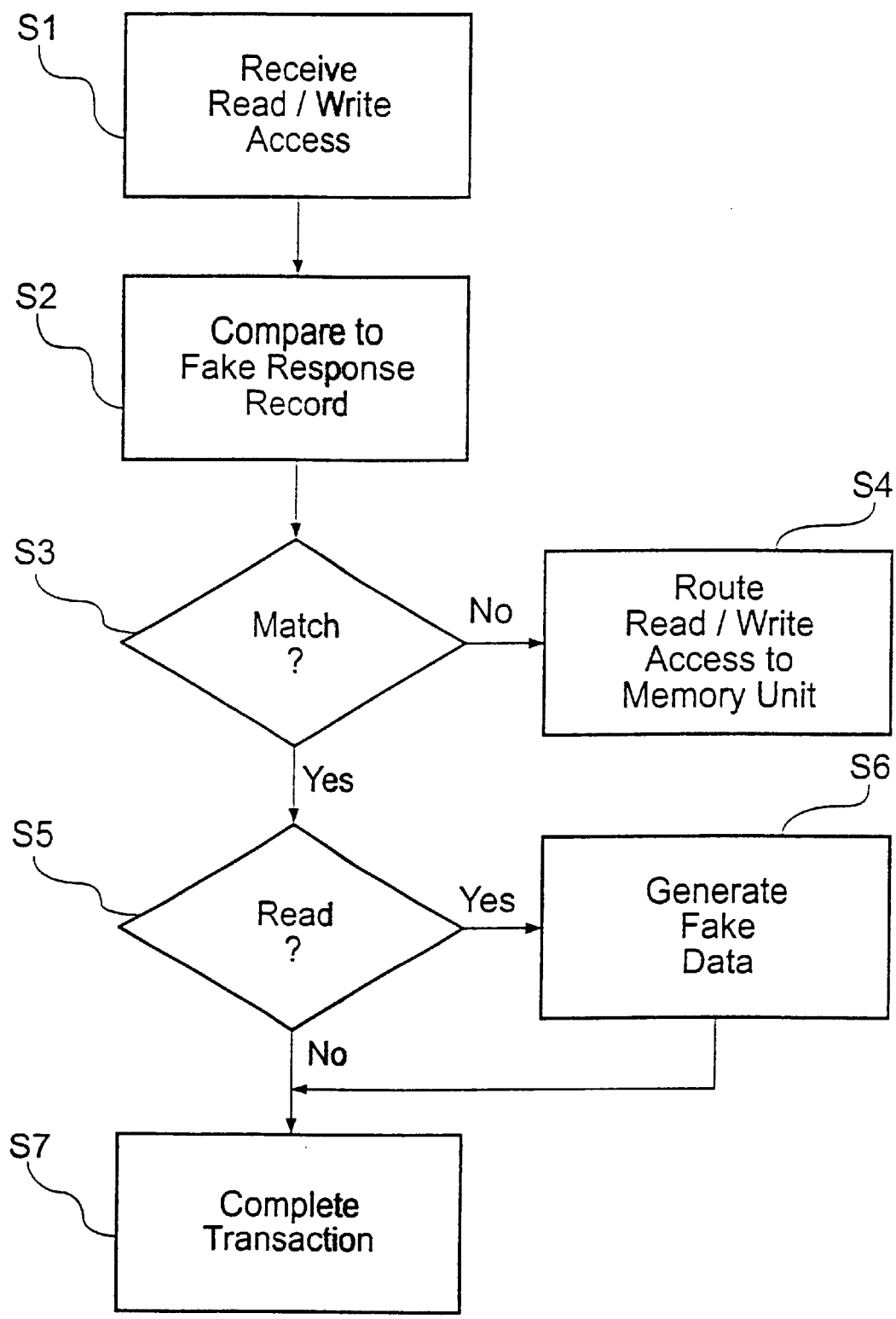
FIG. 7 is a flow diagram illustrating aspects of the operation of the memory subsystem.

FIG. 7 is a flow diagram illustrating aspects of the operation of the memory subsystem.

In FIG. 7, step S1 represents the receipt of a read and/or write access request by the access control logic 40.

In step S2, the address for the received access request is compared to the fake response record 42.

In step S3, if a match is not found, then the access control logic 40 passes the access request to the routing logic 34 to be passed to the appropriate memory unit to effect the write or read access.

In step S3, if a match is found, then the access control logic 40 prevents the access from occurring and causes a fake response to be generated.

In step S5, if it is determined that the access is a read access, then, in step S6 fake data is generated. If the access is a read access, then control passes directly to step S7.

In step S6, the transaction is completed. This includes the return of any fake response that has been generated.

Figure 8:
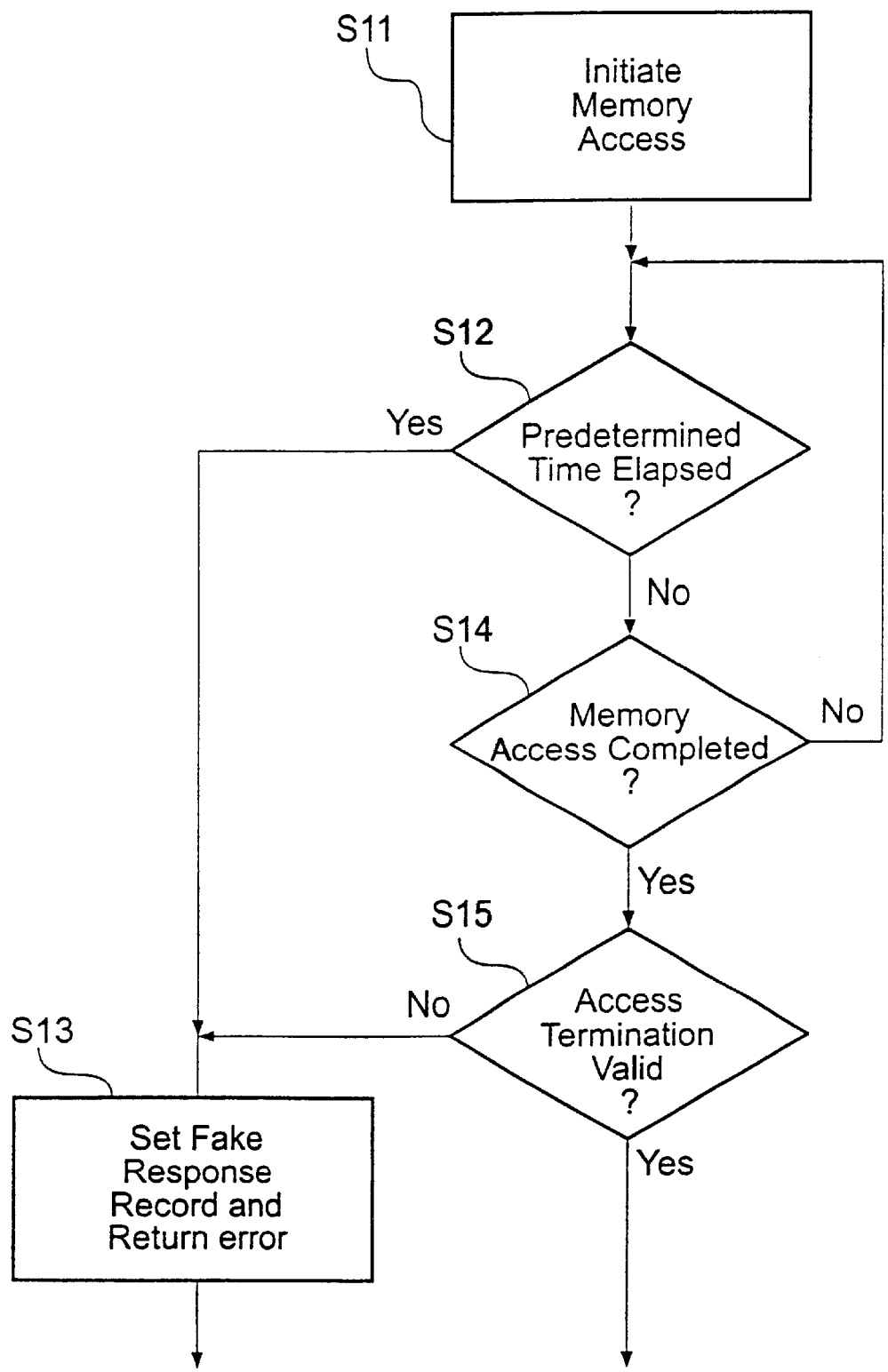
FIG. 8 illustrates further aspects of the operation of the memory subsystem.

FIG. 8 illustrates further aspects of the operation of the memory subsystem. In particular FIG. 8 illustrates the operation of the memory controller to monitor the operation of the memory subsystem and to cause the setting of a fake response record on detecting an error in memory operation.

In step S11, the access control logic is operable to record the timing of the initiation of a memory access along with the address accessed, for example as in step S4 of FIG. 7.

In step S12, the memory access controller is operable to monitor elapsed time. If a predetermined time has elapsed without termination of the memory access transaction, then this is taken as indicative of faulty memory operation in respect of the address location or the access.

In this case, in step S13, a entry is made in the fake response record to indicate that a future access to that location should be faked, and a fault report is returned to the originator of the access request.

If, in step S12, the predetermined time has not elapsed, and in step S14, termination of the memory access is determined to have occurred, then the access termination is checked in step S15. For example, in the case of a read access, the data read from the memory location is checked using conventional validation techniques (e.g. parity or CRC checks). If the data is valid, then the read data is output by the access control logic as the access response.

If, however, in step S15, it is determined that the data is invalid, for example if the parity does not check out, then in step S13, a entry is made in the fake response record to indicate that a future access to that location should be faked, and a fault report is returned to originator of the access request.

As a result of setting an entry in the faked response record, subsequent attempts to access the memory locations identified in the fake response record will result in the access being terminated and the access control logic returning a faked response. Where a subsequent read operation is intended, the actual read could be stopped from occurring and a faked read result (e.g., all zeros) could be generated. Where a subsequent write operation is intended, the actual write operation could be stopped from occurring and a faked acknowledgement could be generated.

The faked response that is provided includes the faking of any status signals, and in the case of a read operation faked data. The actual data returned by the faked response generator does not in fact matter. The values provided as a faked read response could include all zeros, or random data, or the content of any register, buffer, or any other response. For example the response could be generated from values stored in one or more registers of the access control logic or in the fake response record 42. The reason why this does not matter is that any such accesses to a resource for which a faked response is to be generated will follow an initial access which lead to the initial faulty access for which a trap was taken. Exception handling will already be operative to address the initial fault, and the information returned with the subsequent faked response(s) will never be used by the program that generated the initial faulty access.

Although in the above the setting of the fake response record is performed by the access control logic, this could also be performed under the control of the processor 12 of the computer system on detecting a faulty or absent response to an access request, or on being notified of a fault by the access control logic. As mentioned above, the processor will be performing exception handling to resolve the fault. By recording that the fault occurred within a block of memory identified in the fake response record, a repetition of the need to perform exception handling can be avoided by the faking of a response in response to any subsequent attempt to access a location within that block of memory.

Similarly, setting of the fake response record could be performed in response to an I/O device 22 of the computer system detecting a faulty or absent response to a direct memory access request, or on being notified of a fault by the access control logic. Preventing repeated access attempts to a memory location that is know to be unreliable, can avoid unnecessary DMA bus errors.

Accordingly, there has been described an apparatus and a method of providing resource access control in a manner that avoids unnecessary memory accesses where a memory location is already known to be unreliable. A memory controller controls access to one or more memory units. The memory controller includes access control logic operable to receive a memory access request that references at least one memory address. It further includes a fake response record operable to record a fake response indication for an address for which a response is to be faked. The access control logic is operable on receipt of a memory access request to access the fake response record and to fake a response where a fake response indication for an address indicates that a response is to be faked. By providing such a faked response, an embodiment of the invention is able avoid multiple exceptions for the same memory location in a CPU. Also, by providing such a faked response, multiple bus errors for a memory location can also be avoided where a bus supports Direct Memory Access (DMA).

Although particular embodiments of the invention have been described, it will be appreciated that many modifications/additions and/or substitutions may be made within the scope of the invention.

What is claimed is:

1. A memory subsystem memory controller for controlling access to at least one memory unit, the memory subsystem memory controller comprising:

access control logic operable to receive a memory access request that references at least one memory address; and a fake response record operable to record a fake response indication for an address for which a response is to be faked;

the access control logic being operable on receipt of a memory access request to access the fake response record and to fake a response where a fake response indication for an address indicates that a response is to be faked.

2. The memory subsystem memory controller of claim 1, wherein the access control logic is operable to compare an address in a received memory access request to entries in the fake response record and, where a match is found, to generate a faked response.

3. The memory subsystem memory controller of claim 2, wherein the access control logic is operable, where the memory access request is a read request, to generate fake data for the faked response.

4. The memory subsystem memory controller of claim 3, wherein the fake data is held in a fake data register.

5. The memory subsystem memory controller of claim 1, wherein the fake response record is a table of memory locations for which a response is to be faked.

6. The memory subsystem memory controller claim 1, wherein the fake response record identifies blocks of memory locations for which a response is to be faked.

7. The memory subsystem memory controller of claim 1, wherein the fake response record comprises an associative table containing entries for memory addresses for which a response is to be faked.

8. The memory subsystem memory controller of claim 7, wherein the fake response record comprises fake data to be returned for read access for which a response is to be faked.

9. The memory subsystem memory controller of claim 1, wherein the access control logic is operable, on detecting a faulty memory location, to add the memory address for that location to the fake response record.

10. The memory subsystem memory controller of claim 1, comprising routing logic that is operable to connect the access control logic to at least one memory unit.

11. The memory subsystem memory controller of claim 1 integrated in an integrated circuit.

12. A memory subsystem comprising at least one memory subsystem memory controller and at least one memory unit, wherein the memory subsystem memory controller comprises:

access control logic operable to receive a memory access request that references at least one memory address; and a fake response record operable to record a fake response indication for an address for which a response is to be faked;

the access control logic being operable on receipt of a memory access request to access the fake response record and to fake a response where a fake response indication for an address indicates that a response is to be faked.

13. The memory subsystem of claim 12, wherein at least one said memory subsystem memory controller and at least one said memory unit are integrated in an integrated circuit.

14. A computer system comprising a processor, a bus and a memory subsystem that includes at least one memory subsystem memory controller and at least one memory unit, wherein the memory subsystem memory controller comprises:

access control logic operable to receive a memory access request that references at least one memory address; and a fake response record operable to record a fake response indication for an address for which a response is to be faked;

the access control logic being operable on receipt of a memory access request to access the fake response record and to fake a response where a fake response indication for an address indicates that a response is to be faked.

15. The computer system of claim 14, wherein the processor is operable, on detecting a faulty memory location, to cause the access control logic to add a memory address for that location to the fake response record.

16. A method of controlling memory access by a memory controller in a memory subsystem, the method comprising:

receiving, at a memory controller, a memory access request that references at least one memory address;

accessing a fake response record to determine whether a response for at least one memory for the access is to be faked; and if the response is to be faked, returning a faked response.

17. The method of claim 16, comprising comparing an address in a received memory access request to entries in the fake response record to determine whether a faked response is to be generated.

18. The method of claim 16, comprising generating fake response data where the memory access request is a read request.

19. The method of claim 18, comprising retrieving the fake data from a fake data register.

20. The method of claim 18, comprising retrieving the fake data from the faked response record.

21. The method of claim 16, comprising adding a memory address for that location to the fake response record on detecting a faulty memory location.

22. A method of controlling memory access by a memory controller, the method comprising:

receiving, at a memory controller, a memory access request that references at least one memory address;

accessing a fake response record to determine whether a response for at least one memory for the access is to be faked;

generating fake response data where the memory access request is a read request; and if the response is to be faked, returning a faked response.

23. A method of controlling memory access by a memory controller, the method comprising:

receiving, at a memory controller, a memory access request that references at least one memory address;

accessing a fake response record to determine whether a response for at least one memory for the access is to be faked;

generating fake response data where the memory access request is a read request;

retrieving the fake data from a fake data register; and if the response is to be faked, returning a faked response.

24. A method of controlling memory access by a memory controller, the method comprising:

receiving, at a memory controller, a memory access request that references at least one memory address;

accessing a fake response record to determine whether a response for at least one memory for the access is to be faked;

generating fake response data where the memory access request is a read request;

retrieving the fake data from the faked response record; and if the response is to be faked, returning a faked response.

\* \* \* \* \*